United States Patent
Freudenthal et al.

(10) Patent No.: US 9,495,741 B2
(45) Date of Patent: Nov. 15, 2016

(54) METHODS AND SYSTEMS FOR STREAMLINING OPTICAL CALIBRATION

(71) Applicant: LIFE TECHNOLOGIES CORPORATION, Carlsbad, CA (US)

(72) Inventors: Jacob K. Freudenthal, San Jose, CA (US); Jeffrey A. Marks, Mountain View, CA (US); Francis T. Cheng, Palo Alto, CA (US); Thomas Wessel, Pleasanton, CA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 159 days.

(21) Appl. No.: 14/348,206

(22) PCT Filed: Sep. 30, 2012

(86) PCT No.: PCT/US2012/058197
§ 371 (c)(1),
(2) Date: Mar. 28, 2014

(87) PCT Pub. No.: WO2013/049776
PCT Pub. Date: Apr. 4, 2013

(65) Prior Publication Data
US 2014/0294268 A1 Oct. 2, 2014

Related U.S. Application Data

(60) Provisional application No. 61/660,343, filed on Jun. 15, 2012, provisional application No. 61/660,569, filed on Jun. 15, 2012, provisional application No. 61/541,453, filed on Sep. 30, 2011, provisional application No. 61/541,515, filed on Sep. 30, 2011.

(51) Int. Cl.
G06K 9/00 (2006.01)
G06T 7/00 (2006.01)
G06T 5/00 (2006.01)
G06T 5/50 (2006.01)

(52) U.S. Cl.
CPC ............. *G06T 7/0012* (2013.01); *G06T 5/008* (2013.01); *G06T 5/50* (2013.01); *G06T 2207/10024* (2013.01); *G06T 2207/10064* (2013.01); *G06T 2207/10144* (2013.01); *G06T 2207/20021* (2013.01); *G06T 2207/20216* (2013.01); *G06T 2207/30072* (2013.01)

(58) Field of Classification Search
None
See application file for complete search history.

(56) References Cited

U.S. PATENT DOCUMENTS

2005/0244040 A1 11/2005 Li et al.
2010/0142848 A1* 6/2010 Kolterman et al. .......... 382/274

FOREIGN PATENT DOCUMENTS

EP 1422661 5/2004

OTHER PUBLICATIONS

International Search Report and Written Opinion of the ISA for International Appl. No. PCT/US2012/058197 dated Dec. 21, 2012.
Wang, Xujing et al., "A Novel Approach for High-Quality Microarray Processing Using Third-Dye Array Visualization Technology", *IEEE Transactions on Nanobioscience*, vol. 2, No. 4, 2003, 193-201.
Pisano, Etta D. et al., "Image Processing Algorithms for Digital Mammography: A Pictorial Essay", *Imaging & Therapeutic Technology*, vol. 20, No. 5, 2000, 1479-1491.

* cited by examiner

*Primary Examiner* — Atiba O Fitzpatrick (57) ABSTRACT

A method for calibrating a biological instrument is provided. The method comprises the steps of acquiring an image of at least one biological sample array, determining a first region of interest within the image, wherein the first region of interest comprises a first plurality of locations on the at least one biological array; and identifying within the first region of interest, a plurality of image elements associated with each of the first plurality of locations on the at least one biological array.

39 Claims, 4 Drawing Sheets

METHODS AND SYSTEMS FOR STREAMLINING OPTICAL CALIBRATION

CROSS-REFERENCE TO RELATED APPLICATIONS

This application claims the benefit of priority of U.S. provisional application Ser. No. 61/541,453, filed on Sep. 30, 2011, U.S. provisional application Ser. No. 61/660,569, filed Jun. 15, 2012, and U.S. provisional application Ser. No. 61/660,343, filed Jun. 15, 2012, all of which are incorporated herein by reference in their entireties

BACKGROUND

Generally, optical calibration of biological analysis and research instruments, such as a qPCR system, is very complex and requires several steps that are not suitable for execution by a user or the customer. Initial optical calibration of an instrument is typically conducted in a manufacturing environment, and periodic re-calibration is frequently conducted at a user's location by field service engineers. This adds considerable cost to the upkeep of the instrument.

With the advancements in designs to increase the versatility of, for example, qPCR instruments, single instruments may support multiple sample formats such as, for example, 96 and 384 well microtiter plates, TLDA microcards and though-hole microarrays. In microarrays, for example, the number of through-holes can vary depending on the needs of the user and the experiment. An example of a microarray can be a consumable that can have 3072 through-holes for running biological experiments. In another example, a microarray may have at least 10000 through-holes for running biological experiments. This allows a user to expand the capabilities of a previously purchased instrument at any time during the life of the instrument. In these instances, it becomes advantageous to provide a method of optically calibrating the existing instrument to accommodate a new sample format. Additionally providing the optical calibration capability to the user allows for a cost effective and efficient expansion of an existing instrument installation.

SUMMARY OF THE INVENTION

In an embodiment of the present invention, a method for calibrating a biological instrument is provided. The method comprises the steps of acquiring an image of at least one biological sample array, determining a first region of interest within the image, wherein the first region of interest comprises a first plurality of locations on the at least one biological array; and identifying within the first region of interest, a plurality of image elements associated with each of the first plurality of locations on the at least one biological array In another embodiment, the first plurality of locations can comprise a plurality of sample locations.

In another embodiment, a plurality of image elements are associated with each of the plurality of sample well locations.

In another embodiment, a plurality of image elements is associated with a second plurality of locations between the plurality of sample well locations.

In another embodiment, a second region of interest is determined within the image that comprises the at least one biological sample array.

In yet another embodiment, an algorithm can be applied to the plurality of image elements combined with the region of interest that comprises the at least one biological sample array. The algorithm will produce quantified images of the plurality of sample well locations.

In another embodiment, at least one background fluorescence image associated with the at least one biological sample array, can be combined with the second plurality of locations between the plurality of sample well locations to produce an at least one total background fluorescence image.

In another embodiment, a second algorithm can be applied to the quantified images of the plurality of sample well locations and the at least one total background fluorescence image to produce background corrected quantified images of the plurality of sample well locations.

In another embodiment, at least one fluorescence uniformity image can be associated with the background corrected quantified images of the sample well locations.

In another embodiment, a third algorithm can be applied to the background corrected quantified images of the plurality of sample well locations and the at least one fluorescence uniformity image to produce uniformity corrected images of the background corrected quantified images.

In another embodiment, a plurality of pure dye fluorescence images can be associated with the uniformity corrected images of the background corrected quantified images.

In yet another embodiment, a fourth algorithm can be applied to the uniformity corrected images of the background corrected quantified images, and the plurality of pure dye images to produce a plurality of dye intensity images of the sample well locations In other embodiments, the image can be an optical image comprised of a plurality of sub-images. The sub-images may be rectangular or circular shaped.

In yet other embodiments, the image may be a background image, a uniformity image, or a pure dye image, each of which may be a reflected light or fluorescent image.

In another embodiment, the image elements can comprise a plurality of pixels.

In yet another embodiment, the pixels can be rectangular.
In another embodiment, the pixels can be circular.

DETAILED DESCRIPTION

Exemplary systems for methods related to the various embodiments described in this document include those described in U.S. Provisional Patent Application No. 61/541,453, U.S. Provisional Patent Application No. 61/541,342, U.S. Provisional Patent Application No. 29/403,049, U.S. Provisional Patent Application No. 61/541,495, U.S. Provisional Patent Application No. 61/541,366, and U.S.

Provisional Patent Application No. 61/541,371, all of which are filed Sep. 30, 2011, and all of which are also incorporated herein in their entirety by reference.

To provide a more thorough understanding of the present invention, the following description sets forth numerous specific details, such as specific configurations, parameters, examples, and the like. It should be recognized, however, that such description is not intended as a limitation on the scope of the present invention, but is intended to provide a better description of the exemplary embodiments.

The present application relates to streamlining a user's optical calibration workflow for consumables in biological analysis and research instruments, such as a qPCR system.

Figure 1:
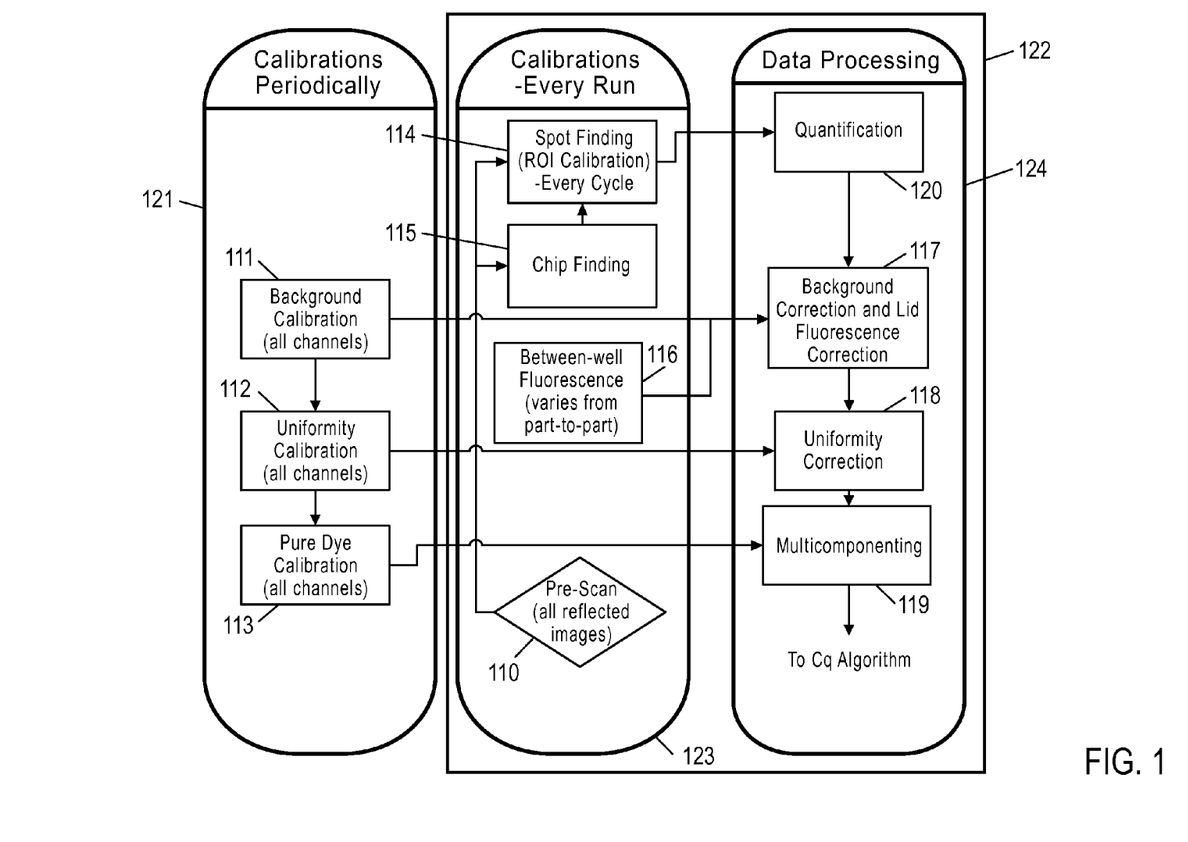
FIG. 1 is a flow diagram that illustrates an embodiment of a calibration strategy upon which embodiments of the present teachings may be implemented.

According to various embodiments described herein, the optical calibration of an instrument using a multistep process requiring various custom tools is provided. According to various embodiments, the steps for optical calibration can include, for example, a Pre-Scan calibration, a Background calibration, a Between-well Fluorescence measurement, a Uniformity calibration and a Pure Dye calibration as shown in FIG. 1. Each of these, and other, calibrations will be discussed below.

Figure 4:
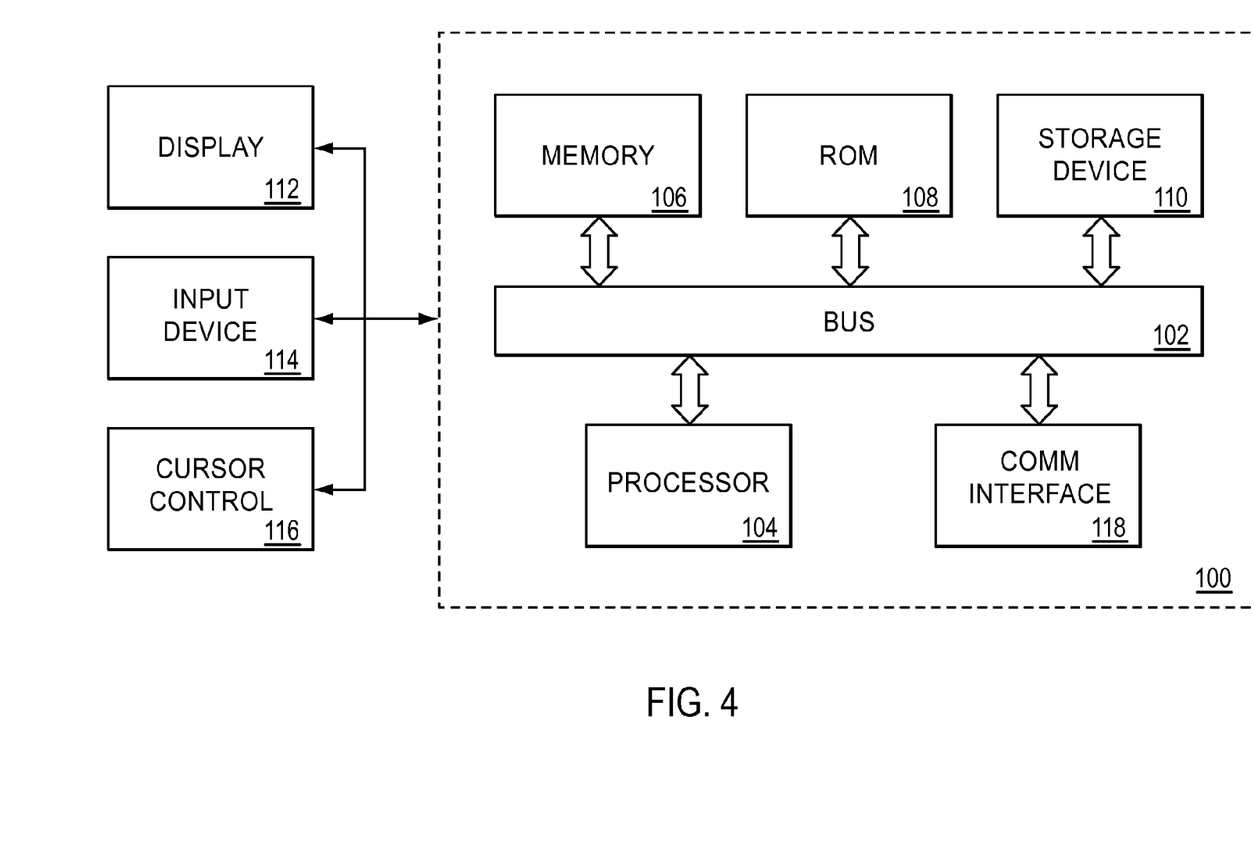
FIG. 4 is a block diagram that illustrates a computer system that may be employed to carry out processing functionality, according to various embodiments.

The calibrations described below are flexible and can be done, for example, on-site, in a manufacturing facility, by a service engineer upon installation of the instrument, or by a user after instrument installation. The user may re-calibrate periodically (e.g. monthly, yearly, weekly, daily, etc.) according to embodiments described herein. The ease of each calibration, including the ability to calibrate the instrument without the need to fill arrays, wells or any other kind of sample volume retaining means, enables the user to calibrate the system themselves. It should be recognized that various embodiments of methods described herein may be implemented by a processing system connected to a memory. An exemplary processing system is illustrated in FIG. 4, and will be discussed later.

According to various embodiments, the input and output of all calibration steps may be in the form of sub-images, with each sub-image corresponding to the location of an array position. Corrections can be applied to individual arrays to reduce the overall file sizes compared to the file size generated by correcting all arrays in one file.

The calibration workflow can also be used to improve data from end-point runs and for other non-real-time data like, for example, a ROX signal, which can be collected twice per run. The calibration workflow can also improve the quality of data for all applications run on the system. Examples of such applications are presented below.

In various embodiments, the devices, instruments, systems, and methods described herein may be used to detect one or more types of biological components of interest. These biological components of interest may be any suitable biological target including, but not limited to, DNA sequences (including cell-free DNA), RNA sequences, genes, oligonucleotides, molecules, proteins, biomarkers, cells (e.g., circulating tumor cells), or any other suitable target biomolecule.

In various embodiments, such biological components may be used in conjunction with various PCR, qPCR, and/or dPCR methods and systems in applications such as fetal diagnostics, multiplex dPCR, viral detection and quantification standards, genotyping, sequencing validation, mutation detection, detection of genetically modified organisms, rare allele detection, and copy number variation. Embodiments of the present disclosure are generally directed to devices, instruments, systems, and methods for monitoring or measuring a biological reaction for a large number of small volume samples. As used herein, samples may be referred to as sample volumes, or reactions volumes, for example.

According to various embodiments described herein, the calibration, sample location and noise removal methods may be implemented on image data including, but not limited to, reflected light and fluorescent images. In other embodiments, the calibration, sample location and noise removal methods may be implemented using data from any one or any combination of, for example, detection of positive and negative ions, pH detection, voltage detection, or current detection. Furthermore, it should also be appreciated that the calibration, sample locating, and noise removal methods described herein may be applied to a variety of sample substrate formats including, for example, chips, arrays, and plates. Furthermore, in accordance with various embodiments described herein sample volumes may be included in, but not limited to, wells, through-holes, indentations, spots, cavities, sample retainment regions, regions-of-interest, and reaction chambers, for example.

While generally applicable to quantitative polymerase chain reactions (qPCR) where a large number of samples are being processed, it should be recognized that any suitable PCR method may be used in accordance with various embodiments described herein. Suitable PCR methods include, but are not limited to, digital PCR, allele-specific PCR, asymmetric PCR, ligation-mediated PCR, multiplex PCR, nested PCR, qPCR, genome walking, and bridge PCR, for example.

Calibration/Correction Order/Validity

The steps of the calibration/correction process can be divided into groups of steps that can be distinguished from each other by their relationship to running an experiment.

Referring to FIG. 1, a first group of steps 122 can include those steps that can be performed prior to running an experiment. A second group of steps 121 can include those steps that can be performed while running an experiment. Second group 121 can be further divided into sub-groups. The sub-groups can include, for example, a sub-group of calibration steps 123 and a sub-group of data processing steps 124.

Additionally, in the embodiment illustrated in FIG. 1, the calibration steps can be inter-related or dependant on other steps of the process and are depicted in FIG. 1 as arrows. These dependencies can result in a step being performed as a pre-requisite to performing another step. A pre-requisite step can be due to, for example, preferred order of calibrations or age of a calibration data file of another step in the process.

For example, in one embodiment, the results of a background calibration 111 may be used to perform a uniformity calibration 112 at a periodic interval. That same background calibration 111 can also be combined with between-well fluorescence 116 to support a background and between-well correction 117 during data processing 124.

In another embodiment, a pre-scan calibration 110, for example, may be performed prior to a chip finding calibration 115. The results of both the chip finding calibration 115 and the pre-scan calibration 110 can then be used to perform a spot finding or region of interest (ROI) calibration 114. This can be useful, for example, when through-hole, or array plates are the format used on the instrument being calibrated.

Further, a completed region of interest calibration 114 can contribute to determining a quantified fluorescent image 120.

In another embodiment, performing a uniformity calibration 112 may require a background calibration 111 to be performed first, and subsequently performing a pure dye calibration 113 as well as executing uniformity correction 118 and multicomponenting 119 to preserve the system calibration.

A discussion of individual calibration modules follows below.

Pre-Scan

Pre-scan calibration is a utility that can be performed while running an experiment. It can be used to image a target for reflective or fluorescent images with a set of defined filter configurations. These images can be used to determine, for example, appropriate exposure time and duty cycle to provide a strong signal without saturation. Exposure time can refer to how long a target may be exposed to an excitation source. Duty cycle can refer to the relationship of how long the excitation source is on, as compared to how long the excitation source is off within the set exposure time. Appropriate exposure time and duty cycle can be important to establish a good signal to noise ratio. If an image is saturated, the data becomes unusable, so the pre-scan enables good signal-to-noise without saturating the detector. In certain embodiments of the pre-scan calibration, there can be an upper limit to the exposure time and duty cycle used. These limits can be determined during the manufacture of the instrument, and are, for example, dependant on the noise in the emission images. Noise in the emission images will be discussed in more detail below.

Figure 2:
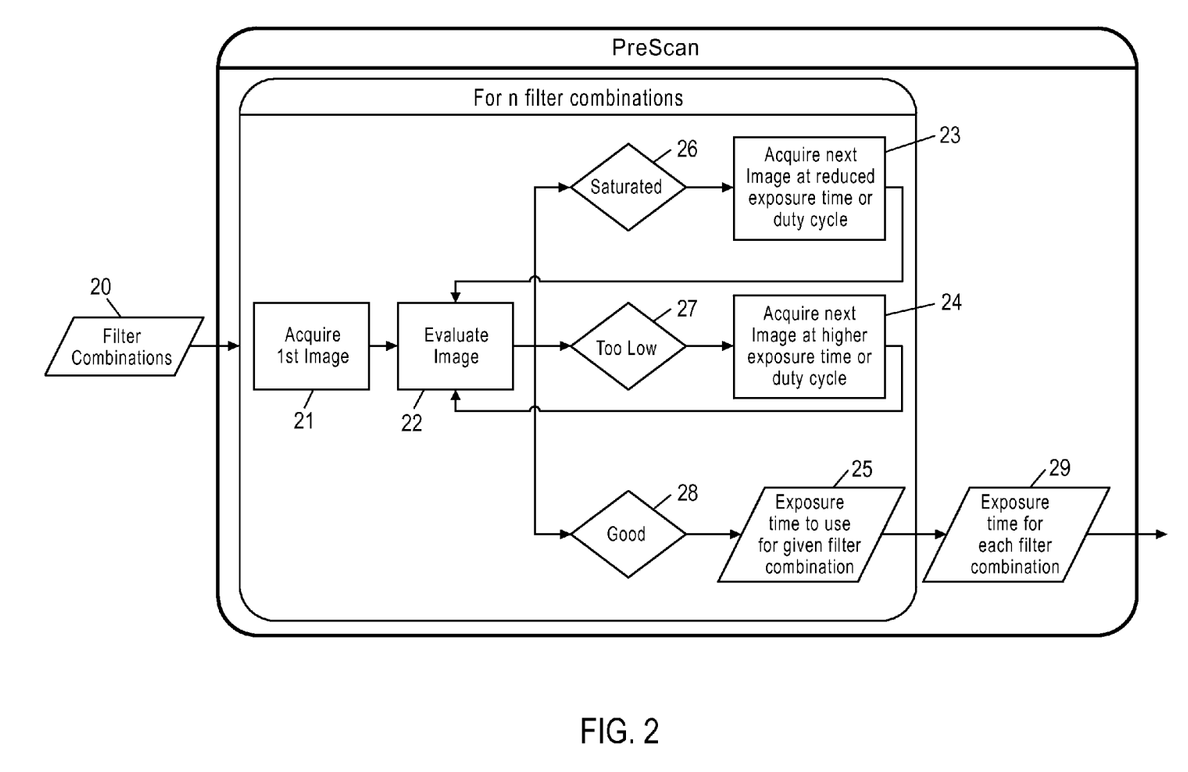
FIG. 2 is a flow diagram that illustrates an embodiment of a portion of the calibration strategy known as pre-scan upon which embodiments of the present teachings may be implemented.

In an embodiment, the pre-scan can be performed during an experiment run before the normal data collection is started. As illustrated in FIG. 2, the pre-scan process can be performed on the reflected light filter combinations 20 that can be used for spot finding 114. Spot finding 114 refers to an algorithm used to determine the location of samples on an array, substrate, or similar sample holder. For example, one could use a spot finding algorithm to determine locations of through-holes in an image of a microarray. The pre-scan allows the user to, for example, account for the instrument-to-instrument and array-to-array variability in signal from reflected light images. In the embodiment illustrated by FIG. 2, the system can start by acquiring a first image 21 and then use this to evaluate the fluorescence levels 22. Fluorescence levels are known in the art to be measured in Fluorescence Units (FU). If, for example, the fluorescence level is within acceptable limits of exposure time and duty cycle, the image is reported as good 28. An acceptable limit of exposure time can be, for example, between 2 seconds and 16 seconds, while duty cycle can be, for example, between 0% and 100%. If, for example, the signal levels are saturated 26, the system will take another image with a reduced exposure time or duty cycle 23. Conversely, for example, if the signal levels are too low 27, the system will take another image at a higher exposure time or duty cycle 24. For either saturated 26 or too low 27 signal levels, the next image taken can be evaluated again 22 for sufficiency.

In one embodiment, the determination of exposure time and duty cycle can be divided into two processes. First, the exposure time can be adjusted while keeping the duty cycle constant. Images can be evaluated for acceptable fluorescence levels with the adjusted exposure times until an upper or lower exposure limit is reached, or a sufficient fluorescence level is obtained. If the image is determined to be unacceptable upon reaching an exposure limit, the duty cycle can be adjusted and the exposure time can once again be adjusted. This process can be repeated for the embodiment illustrated in FIG. 2, until an optimal exposure time and duty cycle is provided for all the defined filter combinations 29. This process can be performed, for example, at installation, during manufacturing and during any subsequent verification array runs conducted by a customer. Each time this process is performed, the system can start the search with a default set of parameters for exposure time and duty cycle. The default parameters can be determined during, but not limited to, manufacturing or system development.

In another embodiment, the determination of exposure time and duty cycle can be completed in a single process. In one example, both the exposure time and the duty cycle can be adjusted in the same direction prior to obtaining a new image. The adjustments can be to either a higher level or to a lower level each time the process is repeated after an image is evaluated for fluorescence level. In another example, the exposure time and duty cycle can be adjusted in opposite directions prior to obtaining a new image.

In yet another embodiment, the determination of exposure time and duty cycle can be accomplished through the use of a predictive algorithm. Such an algorithm may use increments of increased or decreased exposure time and duty cycle to predict an exposure time and duty cycle to obtain sufficient fluorescence.

In some cases, the signal levels can be strong enough to saturate even with the lowest allowable exposure time and duty cycle. In still other cases, the signal levels can be weak. These weak fluorescence levels can be insufficient to obtain sufficient fluorescence levels even with the highest allowable exposure time and duty cycle. In these situations, this system conducting the calibration can provide an indication that an error occurred. If no errors occur, the user may be alerted as to the pre-scan calibration status or the instrument can avoid providing any feedback at the completion of the pre-scan calibration.

Background Calibration

Background calibration can determine the background fluorescence component per well for data collected from the system. The calibration can generate a background image for each channel. A channel can be a combination of one emission filter and one excitation filter. Each channel can be configured with appropriate filters for the type of image required.

The calibrator for background calibration can be, for example, a black plastic target that has the same x and y dimensions as an array carrier. The target can be infused with a substance to absorb light. For example, the target can be infused with graphite. It can also be advantageous for the target to be non-fluorescent. This calibration can be performed, for example, during installation of the instrument, during periodic preventative maintenance, at recommended intervals or whenever the customer/user chooses. For example, the user can perform a background calibration after removing dust from the optics Each time the background calibration is performed replicate/multiple images can be collected for each of the fluorescent filter combinations used by the current applications on the instrument, for at least two exposure times. The number of replicate images taken can vary, such that the number of multiple images can be sufficient for averaging of the images by the system. The image averaging can be used to increase the signal-to-noise ratio.

It has been discovered that two exposure times can be sufficient to define the background characteristics of the target. The images taken during the two exposure times can be used to represent, for example, fluorescence versus exposure time relationship with a straight line. The two exposure times can also be used to calculate a slope and offset of fluorescence versus exposure time. The calculation of slope and offset can be accomplished by the application of the general form of the equation for a straight line, y=mx+b where m is the slope of the line and b is the offset. During each run, a set of background intensity values can be generated for each array for each filter channel from the slope and offset calculated above. The calculation of the background values can be done, for example, once per run, or more as necessary. The system can generate background values, for example, by taking the spot positions from the first cycle and using them to quantify the background images. Moreover, each quantified well within each array or each run image can have the respective background intensity value subtracted, thereby correcting the intensity of the image of each well during the run.

Between-Well Fluorescence Correction

Referring to FIG. 1, between-well fluorescence 116 can provide a representation of fluorescence detected between wells of an array. Between-well fluorescence 116 can be combined with background values 111, as shown in the example of FIG. 1, to provide background and between-well correction 117 of quantification data 120 during data processing 124. Between-well fluorescence 116 can be used to compensate for variable optical characteristics of array holders. It has been discovered that lids of array holders may not exhibit the same level of fluorescence from lid-to-lid. Subtracting between-well fluorescence 116 images from sample array images can allow a user to compare data across arrays that use different array holders and lids.

In one embodiment, between-well fluorescence 116 measurements can use a separate calibrator for obtaining between-well images. A separate calibrator can be an array and holder that is the same or similar to an array and holder that can be used for running a sample. Further, a separate calibrator can be used to obtain between-well images prior to a sample run instead of during a run.

In another embodiment, between-well fluorescence 116 images can be taken during a sample run. Imaging during a sample run can avoid the need for a separate calibrator. Each run can use the arrays within the run for image capture. Using arrays within the run is possible because the between-well fluorescence 116 images can be extracted from the sample images. The calibration can occur, for example, within each fluorescent image during the quantification step of the run. The extracted between-well images can be used to form an overall background for the array. A corrected image can be formed by subtracting the overall background for the array and the background calibration 111 from the respective through-hole quantification values.

Uniformity

Referring to FIG. 1, a uniformity calibration 112 can be performed by imaging a high-signal fluorescent target for each of the filter channels. The target used can be, for example, a plastic film manufactured to fluoresce at specific wavelengths. The wavelengths of interest can correspond to the emission filters in the system. It has been discovered that a thin target can ensure the best optical match to the array signal pattern. For example, a thin target can be less than 0.5 mm. During a run, this image can be used to correct for systematic optical non-uniformity of the instrument. Systematic optical non-uniformity can be made up of the cumulative tolerances of the optical components including the excitation source(s).

The uniformity calibration 112 can be performed, for example, during installation of the system, during periodic preventive maintenance, during manufacturing of the system or by a user in a laboratory.

Replicate images can be collected for each of the filter combinations installed in the system. Each channel's images can be averaged, adjusted by subtracting background calibration 111 and the resulting image can represent the uniformity calibration of the system. This uniformity calibration can then be applied to quantified 120 and background and between-well correction 117 images prior to multicomponenting 119.

During each run, a set of uniformity normalization factors can be generated for each array for each filter channel. The factors can be created, for example, by taking spot positions from the first spot finding call, discussed above in the Pre-Scan discussion, and using them to quantify the uniformity images. Quantification of the images can be accomplished through the use of an averaging algorithm. An averaging algorithm can be developed to be specific to an optical system and the format and quality of the images available. The quantified values can be converted into uniformity correction factors by essentially dividing the background subtracted image by the uniformity image. Uniformity correction factors can be determined for individual wells or images. Each quantified well within each array can also be normalized to its respective uniformity correction factor.

Pure Dye

Figure 3:
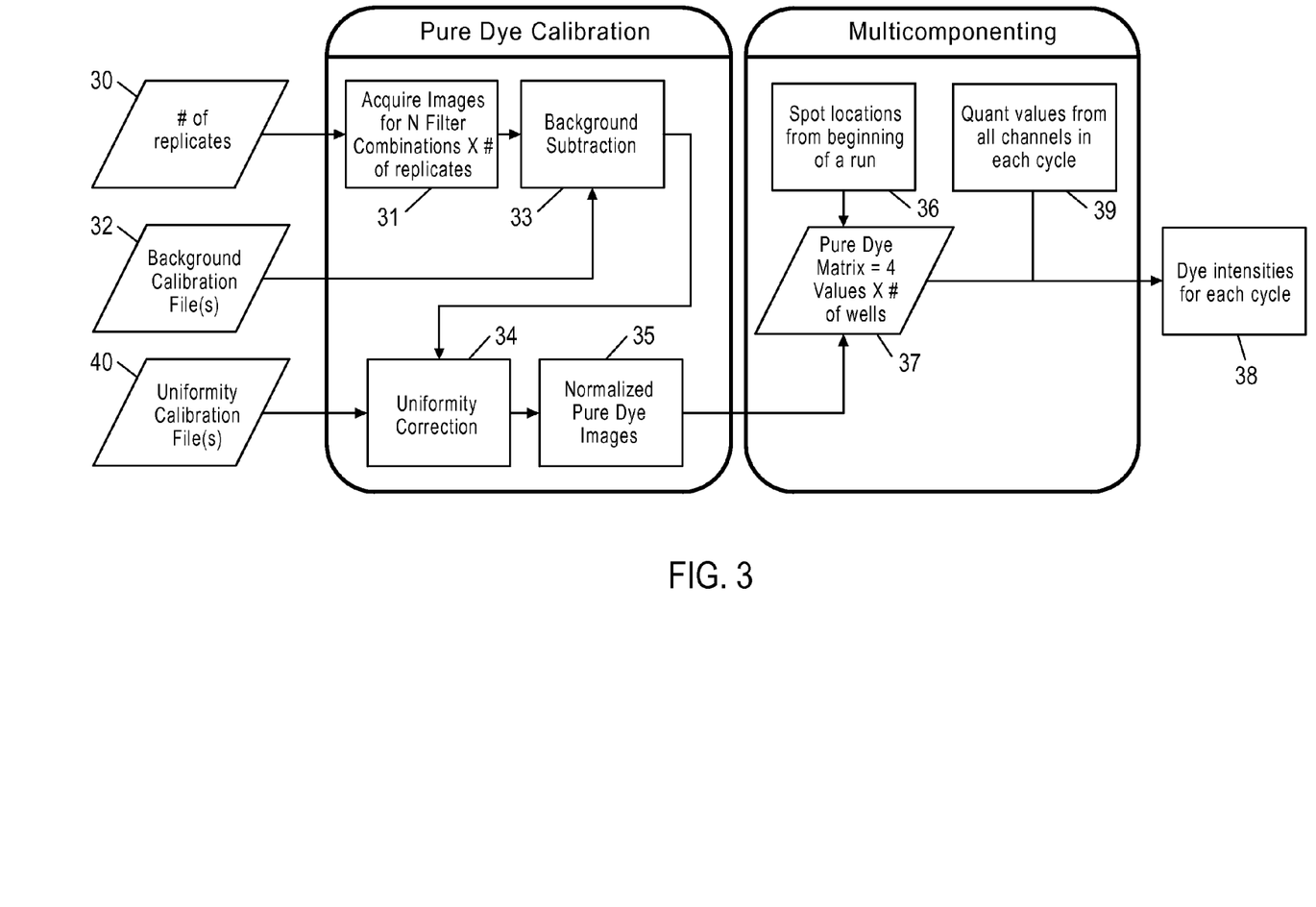
FIG. 3 is a flow diagram that illustrates an embodiment of a portion of the calibration strategy known as pure dye calibration upon which embodiments of the present teachings may be implemented.

FIG. 3 illustrates a procedure for pure dye calibration and multi-component correction. The pure dye calibration step will generate pure dye images (35) for each fluorescent dye detectable by the system. Detectable dyes are determined, for example, by the user's choice of assays and probes. Detectable dyes are also, for example, matched to the wavelengths of the emission filters installed in the system.

In one embodiment, a system can be used to detect three dyes. In one example, the three dyes can be FAM, VIC and ROX. It is well known, that VIC and ROX dyes have minimal spectral overlap with other dyes, such as FAM. In this embodiment, because of the minimal spectral overlap with other dyes (FAM), a pure dye calibration for VIC and ROX can be applied across all instruments through the use of a fixed dye matrix.

In another embodiment, all dyes in use on the system can be calibrated for a specific instrument. For example, a set of dyes that exhibit strong spectral overlap may benefit from instrument specific pure dye calibrations for the system to discriminate between fluorescent dye signals during a run.

An embodiment of a pure dye calibration is depicted in FIG. 3. Normalized Pure Dye Images 35 can be used during a run to calculate pure dye matrices 37, as described below. In this embodiment, the array carrier houses four array cases and can be filled with 200 nM FAM dye and sealed. In this embodiment, no arrays are inserted into the cases.

Continuing with FIG. 3, replicate images 30 can be collected for each of the fluorescent filter combinations 31. Each filter combination's images are averaged, and the resulting averaged images can be background-subtracted 33 using background calibration file(s) 32 and uniformity-normalized 34 using uniformity calibration file(s) 40 respectively. The uniformity calibration file(s) 40 are also referred to in FIG. 1 by reference number 112, and presented above in the Pre-Scan discussion. The uniformity-normalized dye images 35 can be produced by essentially dividing the background subtracted image by the uniformity image FIG. 3 further illustrates the process of multicomponenting. During multicomponenting, spot positions 36 can be used to quantify each respective pure dye calibration image 35. (Refer to the Pre-Scan discussion above for determining spot positions. Quantification of images was presented above in the Uniformity discussion.) The quantified values can be converted to a normalized spectral matrix of the FAM dye 37 (for example, each of the four filter values per well can be normalized to the brightest filter for that well). Using the normalized spectral matrix 37 and uniformity corrected quant values 39 from, for example, all channels in each cycle, algorithms associated with the illustrated calibration workflow allow the determination of dye intensity values 38 for each cycle.

This calibration can be performed, for example, during system installation, during periodic preventive maintenance or by the user in a laboratory environment to ensure that the plate uniformity is valid.

Sample Location Finding and Background Removal

In certain embodiments, the calibration methods described above may be sufficient to perform the desired analysis with the biological instrument. In other embodiments, additional methods may be used to obtain data that can also indicate locations of regions-of-interest and remove distortions and other unwanted background noise in the detected emission data. Background noise may refer to inherent system noise as well as other undesired signals. For example, some background noise in the data may be due to physical sources on the substrate, such as dust particles or scratches, for example. Another example of a physical source that may provide background noise is a holder or case holding or enclosing the substrate. Other background noise in the data may be due to natural radiation from the surfaces in the instrument, such as reflection and natural fluorescence. Other background noise may also be a result from the optical system detecting the emission data or the light source, for example.

The biological system may be detecting several hundred to several thousand samples, all of which may be a very small volume. For example, sample sizes in a microarray can be 30 nanoliters or less. As such, other background noise removal methods may be used alone or in combination with the calibration methods described in this document according to various embodiments to be able to determine and analyze the emission data from the sample volumes. In some embodiments, the location of sample volumes may be more accurately determined within the substrate to perform a more accurate analysis. For example, in a digital PCR analysis, having the ability to more accurately distinguish reactions in sample volumes versus non-reactions may produce more accurate results. Even further, according to various embodiments described herein, empty wells or through-holes may be distinguished from sample volumes in wells or throughholes that did not react, which may also be distinguished from sample volumes in wells or throughholes that did react.

According to various embodiments described herein, background noise removal may include image data analysis and processing. The method may include analyzing intensity values of the image data to interpolate the background noise that may be removed from the image of the substrate. In this way, locations of the regions-of-interest within the image may also be determined. The background noise removal may also include interpolating data from areas of the image known to include regions-of-interest. After determining the background noise over the image, the background noise may be subtracted from the image data.

Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein can refer to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

FIG. 4 is a block diagram that illustrates a computer system 100 that may be employed to carry out processing functionality, according to various embodiments. Computing system 100 can include one or more processors, such as a processor 104. Processor 104 can be implemented using a general or special purpose processing engine such as, for example, a microprocessor, controller or other control logic. In this example, processor 104 is connected to a bus 102 or other communication medium.

Further, it should be appreciated that a computing system 100 of FIG. 4 may be embodied in any of a number of forms, such as a rack-mounted computer, mainframe, supercomputer, server, client, a desktop computer, a laptop computer, a tablet computer, hand-held computing device (e.g., PDA, cell phone, smart phone, palmtop, etc.), cluster grid, netbook, embedded systems, or any other type of special or general purpose computing device as may be desirable or appropriate for a given application or environment. Additionally, a computing system 100 can include a conventional network system including a client/server environment and one or more database servers, or integration with LIS/LIMS infrastructure. A number of conventional network systems, including a local area network (LAN), a wide area network (WAN) and a Cloud computing configuration including wireless and/or wired components, are known in the art. Additionally, client/server environments, database servers, and networks are well documented in the art.

Computing system 100 may include bus 102 or other communication mechanism for communicating information, and processor 104 coupled with bus 102 for processing information.

Computing system 100 also includes a memory 106, which can be a random access memory (RAM) or other dynamic memory, coupled to bus 102 for storing instructions to be executed by processor 104. Memory 106 also may be used for storing temporary variables or other intermediate information during execution of instructions to be executed by processor 104. Computing system 100 further includes a read only memory (ROM) 108 or other static storage device coupled to bus 102 for storing static information and instructions for processor 104.

Computing system 100 may also include a storage device 110, such as a magnetic disk, optical disk, or solid state drive (SSD) is provided and coupled to bus 102 for storing information and instructions. Storage device 110 may include a media drive and a removable storage interface. A media drive may include a drive or other mechanism to support fixed or removable storage media, such as a hard disk drive, a floppy disk drive, a magnetic tape drive, an optical disk drive, a CD or DVD drive (R or RW), flash drive, or other removable or fixed media drive. As these examples illustrate, the storage media may include a computer-readable storage medium having stored therein particular computer software, instructions, or data.

In alternative embodiments, storage device 110 may include other similar instrumentalities for allowing computer programs or other instructions or data to be loaded into computing system 100. Such instrumentalities may include, for example, a removable storage unit and an interface, such as a program cartridge and cartridge interface, a removable memory (for example, a flash memory or other removable memory module) and memory slot, and other removable storage units and interfaces that allow software and data to be transferred from the storage device 110 to computing system 100.

Computing system 100 can also include a communications interface 118. Communications interface 118 can be used to allow software and data to be transferred between computing system 100 and external devices. Examples of communications interface 118 can include a modem, a network interface (such as an Ethernet or other NIC card), a communications port (such as for example, a USB port, a RS-232C serial port), a PCMCIA slot and card, Bluetooth, etc. Software and data transferred via communications interface 118 are in the form of signals which can be electronic, electromagnetic, optical or other signals capable of being received by communications interface 118. These signals may be transmitted and received by communications interface 118 via a channel such as a wireless medium, wire or cable, fiber optics, or other communications medium. Some examples of a channel include a phone line, a cellular phone link, an RF link, a network interface, a local or wide area network, and other communications channels.

Computing system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104, for example. An input device may also be a display, such as an LCD display, configured with touchscreen input capabilities. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A computing system 100 provides data processing and provides a level of confidence for such data. Consistent with certain implementations of embodiments of the present teachings, data processing and confidence values are provided by computing system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process states described herein. Alternatively hard-wired circuitry may be used in place of or in combination with software instructions to implement embodiments of the present teachings. Thus implementations of embodiments of the present teachings are not limited to any specific combination of hardware circuitry and software.

The term "computer-readable medium" and "computer program product" as used herein generally refers to any media that is involved in providing one or more sequences or one or more instructions to processor 104 for execution. Such instructions, generally referred to as "computer program code" (which may be grouped in the form of computer programs or other groupings), when executed, enable the computing system 100 to perform features or functions of embodiments of the present invention. These and other forms of computer-readable media may take many forms, including but not limited to, non-volatile media, volatile media, and transmission media. Non-volatile media includes, for example, solid state, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on magnetic disk of a remote computer. The remote computer can load the instructions into its dynamic memory and send the instructions over a telephone line using a modem. A modem local to computing system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Further aspects of the present invention can also be described as follows:

In alternative embodiment 1, a method for calibrating a biological instrument is provided comprising: acquiring an image of at least one biological sample array, determining a first region of interest within the image, wherein the first region of interest comprises a first plurality of locations on the at least one biological array and identifying within the first region of interest, a plurality of image elements associated with each of the first plurality of locations on the at least one biological array.

In alternative embodiment 2, the method for calibrating a biological instrument of embodiment 1 is provided, wherein the first plurality of locations comprise a plurality of sample well locations.

In alternative embodiment 3, the method for calibrating a biological instrument of any of the preceding embodiments is provided, wherein the plurality of image elements are associated with each of the plurality of sample well locations.

In alternative embodiment 4, the method for calibrating a biological instrument of any of the preceding embodiments is provided, wherein the plurality of image elements are associated with a second plurality of locations between the plurality of sample well locations.

In alternative embodiment 5, the method for calibrating a biological instrument of any of the preceding embodiments is provided, further comprising determining a second region of interest within the image, wherein the second region of interest comprises the at least one biological sample array.

In alternative embodiment 6, the method for calibrating a biological instrument of any of the preceding embodiments is provided, further comprising determining a second region of interest within the image, wherein the second region of interest comprises the at least one biological sample array.

In alternative embodiment 7, the method for calibrating a biological instrument of any of the preceding embodiments is provided, further comprising determining a second region of interest within the image, wherein the second region of interest comprises the at least one biological sample array.

In alternative embodiment 8, the method for calibrating a biological instrument of any of the preceding embodiments is provided further comprising determining a second region of interest within the image, wherein the second region of interest comprises the at least one biological sample array.

In alternative embodiment 9, the method for calibrating a biological instrument of any of the preceding embodiments is provided, further comprising applying a first algorithm to the plurality of image elements associated with each of the plurality of sample well locations and the at least one biological sample array to produce quantified images of the plurality of sample well locations.

In alternative embodiment 10, the method for calibrating a biological instrument of any of the preceding embodiments is provided, further comprising combining at least one background fluorescence image associated with the at least one biological sample array, with the second plurality of locations between the plurality of sample well locations to produce an at least one total background fluorescence image.

In alternative embodiment 11, the method for calibrating a biological instrument of any of the preceding embodiments is provided, further comprising applying a second algorithm to the quantified images of the plurality of sample well locations and the at least one total background fluorescence image to produce background corrected quantified images of the plurality of sample well locations.

In alternative embodiment 12, the method for calibrating a biological instrument of any of the preceding embodiments is provided, further comprising associating at least one fluorescence uniformity image with the background corrected quantified images of the sample well locations.

In alternative embodiment 13, the method for calibrating a biological instrument of any of the preceding embodiments is provided, further comprising applying a third algorithm to the background corrected quantified images of the plurality of sample well locations and the at least one fluorescence uniformity image to produce uniformity corrected images of the background corrected quantified images.

In alternative embodiment 14, the method for calibrating a biological instrument of any of the preceding embodiments is provided, further comprising associating a plurality of pure dye fluorescence images with the uniformity corrected images of the background corrected quantified images.

In alternative embodiment 15, the method for calibrating a biological instrument of any of the preceding embodiments is provided, further comprising applying a fourth algorithm to the uniformity corrected images of the background corrected quantified images, and the plurality of pure dye images to produce a plurality of dye intensity images of the sample well locations.

In alternative embodiment 16, the method for calibrating a biological instrument of any of the preceding embodiments is provided, wherein the image comprises an optical image.

In alternative embodiment 17, the method for calibrating a biological instrument of any of the preceding embodiments is provided, wherein the optical image further comprises a plurality of sub-images.

In alternative embodiment 18, the method for calibrating a biological instrument of any of the preceding embodiments is provided, wherein each of the plurality of sub-images are rectangular.

In alternative embodiment 19, the method for calibrating a biological instrument of any of the preceding embodiments is provided, wherein each of the plurality of sub-images are circular.

In alternative embodiment 20, the method for calibrating a biological instrument of any of the preceding embodiments is provided, wherein the image comprises a plurality of sub-images.

In alternative embodiment 21, the method for calibrating a biological instrument of any of the preceding embodiments is provided, wherein each of the plurality of sub-images are rectangular.

In alternative embodiment 22, the method for calibrating a biological instrument of any of the preceding embodiments is provided, wherein the each of the plurality of sub-images are circular.

In alternative embodiment 23, the method for calibrating a biological instrument of any of the preceding embodiments is provided, wherein the image comprises a reflected light image.

In alternative embodiment 24, the method for calibrating a biological instrument of any of the preceding embodiments is provided, wherein the reflected light image further comprises a plurality of reflected light sub-images.

In alternative embodiment 25, the method for calibrating a biological instrument of any of the preceding embodiments is provided, wherein the image comprises a fluorescent image.

In alternative embodiment 26, the method for calibrating a biological instrument of any of the preceding embodiments is provided, wherein the fluorescent image further comprises a plurality of fluorescent sub-images.

In alternative embodiment 27, the method for calibrating a biological instrument of any of the preceding embodiments is provided, wherein the image comprises a background image.

In alternative embodiment 28, the method for calibrating a biological instrument of any of the preceding embodiments is provided, wherein the background image further comprises a reflected light image.

In alternative embodiment 29, the method for calibrating a biological instrument of any of the preceding embodiments is provided, wherein the background image further comprises a fluorescent image.

In alternative embodiment 30, the method for calibrating a biological instrument of any of the preceding embodiments is provided, wherein the background image further comprises a combination of at least one reflected light image and at least one fluorescence image.

In alternative embodiment 31, the method for calibrating a biological instrument of any of the preceding embodiments is provided, wherein the reflected light image further comprises a plurality of reflected light sub-images.

In alternative embodiment 32, the method for calibrating a biological instrument of any of the preceding embodiments is provided, wherein the fluorescent image further comprises a plurality of fluorescent sub-images.

In alternative embodiment 33, the method for calibrating a biological instrument of any of the preceding embodiments is provided, wherein the background image further comprises a combination of at least one reflected light sub-image and at least one fluorescent sub-image.

In alternative embodiment 34, the method for calibrating a biological instrument of any of the preceding embodiments is provided, wherein the image comprises a uniformity image.

In alternative embodiment 35, the method for calibrating a biological instrument of any of the preceding embodiments is provided, wherein the uniformity image further comprises at least one uniformity sub-image.

In alternative embodiment 36, the method for calibrating a biological instrument of any of the preceding embodiments is provided, wherein the uniformity image further comprises a fluorescent image.

In alternative embodiment 37, the method for calibrating a biological instrument of any of the preceding embodiments is provided, wherein the fluorescence image further comprises at least one fluorescent sub-image.

In alternative embodiment 38, the method for calibrating a biological instrument of any of the preceding embodiments is provided, wherein the image comprises a pure dye image.

In alternative embodiment 39, the method for calibrating a biological instrument of any of the preceding embodiments is provided, wherein the pure dye image further comprises a fluorescent image.

In alternative embodiment 40, the method for calibrating a biological instrument of any of the preceding embodiments is provided, wherein the fluorescence image further comprises at least one fluorescent sub-image.

In alternative embodiment 41, the method for calibrating a biological instrument of any of the preceding embodiments is provided, wherein the image elements comprise a plurality of pixels.

In alternative embodiment 42, the method for calibrating a biological instrument of any of the preceding embodiments is provided, wherein the plurality of pixels comprise round pixels.

In alternative embodiment 43, the method for calibrating a biological instrument of any of the preceding embodiments is provided, wherein the plurality of pixels comprise rectangular pixels.

The invention claimed is:

1. A method for calibrating a biological instrument comprising:
    executing a pre-scan calibration comprising:
        acquiring an image of at least one biological sample array;
        evaluating the image to determine fluorescence levels;
        modifying the fluorescence levels by adjusting an excitation source with an exposure time and a duty cycle to provide strong fluorescence levels without saturation;
    determining a first region of interest within the image, wherein the first region of interest comprises a first plurality of locations on the at least one biological array; and
    identifying within the first region of interest, a plurality of image elements associated with each of the first plurality of locations on the at least one biological array.

2. The method of claim 1, wherein the first plurality of locations comprise a plurality of sample well locations.

3. The method of claim 2, wherein the plurality of image elements is associated with each of the plurality of sample well locations.

4. The method of claim 2, wherein the plurality of image elements is associated with a second plurality of locations between the plurality of sample well locations.

5. The method of claim 4, further comprising applying a first algorithm to the plurality of image elements associated with each of the plurality of sample well locations and the at least one biological sample array to produce quantified images of the plurality of sample well locations.

6. The method of claim 5, further comprising combining at least one background fluorescence image associated with the at least one biological sample array, with the second plurality of locations between the plurality of sample well locations to produce an at least one total background fluorescence image.

7. The method of claim 6, further comprising applying a second algorithm to the quantified images of the plurality of sample well locations and the at least one total background fluorescence image to produce background corrected quantified images of the plurality of sample well locations.

8. The method of claim 7, further comprising associating at least one fluorescence uniformity image with the background corrected quantified images of the sample well locations.

9. The method of claim 8, further comprising applying a third algorithm to the background corrected quantified images of the plurality of sample well locations and the at least one fluorescence uniformity image to produce uniformity corrected images of the background corrected quantified images.

10. The method of claim 9, further comprising associating a plurality of pure dye fluorescence images with the uniformity corrected images of the background corrected quantified images.

11. The method of claim 10, further comprising applying a fourth algorithm to the uniformity corrected images of the background corrected quantified images, and the plurality of pure dye images to produce a plurality of dye intensity images of the sample well locations.

12. The method of claim 1, wherein the image comprises an optical image.

13. The method of claim 12, wherein the optical image further comprises a plurality of sub-images.

14. The method of claim 13, wherein each of the plurality of sub-images are rectangular.

15. The method of claim 13, wherein each of the plurality of sub-images are circular.

16. The method of claim 1, wherein the image comprises a plurality of sub-images.

17. The method of claim 16, wherein each of the plurality of sub-images are rectangular.

18. The method of claim 16, wherein the each of the plurality of sub-images are circular.

19. The method of claim 1, wherein the image comprises a reflected light image.

20. The method of claim 19, wherein the reflected light image further comprises a plurality of reflected light sub-images.

21. The method of claim 1, wherein the image comprises a fluorescent image.

22. The method of claim 21, wherein the fluorescent image further comprises a plurality of fluorescent sub-images.

23. The method of claim 1, wherein the image comprises a background image.

24. The method of claim 23, wherein the background image further comprises a reflected light image.

25. The method of claim 24, wherein the background image further comprises a fluorescent image.

26. The method of claim 23, wherein the background image further comprises a combination of at least one reflected light image and at least one fluorescence image.

27. The method of claim 24, wherein the reflected light image further comprises a plurality of reflected light sub-images.

28. The method of claim 25, wherein the fluorescent image further comprises a plurality of fluorescent sub-images.

29. The method of claim 23, wherein the background image further comprises a combination of at least one reflected light sub-image and at least one fluorescent sub-image.

30. The method of claim 1, wherein the image comprises a uniformity image.

31. The method of claim 30, wherein the uniformity image further comprises at least one uniformity sub-image.

32. The method of claim 30, wherein the uniformity image further comprises a fluorescent image.

33. The method of claim 32, wherein the fluorescence image further comprises at least one fluorescent sub-image.

34. The method of claim 1, wherein the image comprises a pure dye image.

35. The method of claim 34, wherein the pure dye image further comprises a fluorescent image.

36. The method of claim 35, wherein the fluorescence image further comprises at least one fluorescent sub-image.

37. The method of claim 1, wherein the image elements comprise a plurality of pixels.

38. The method of claim 37, wherein the plurality of pixels comprise round pixels.

39. The method of claim 37, wherein the plurality of pixels comprise rectangular pixels.

* * * * *